No. 771,999. Patented October 11, 1904.

UNITED STATES PATENT OFFICE.

CHARLES ANSON POTTER, OF SAN FRANCISCO, CALIFORNIA.

WATERPROOFED OSTRICH-FEATHER AND PROCESS OF PRODUCING SAME.

SPECIFICATION forming part of Letters Patent No. 771,999, dated October 11, 1904.

Application filed February 20, 1902. Serial No. 94,978. (No specimens.)

*To all whom it may concern:*

Be it known that I, CHARLES ANSON POTTER, a citizen of the United States, and a resident of the city and county of San Francisco and State of California, have invented a new and useful Improvement in Waterproofed Ostrich-Feathers and Processes of Producing the Same, of which the following is a specification.

This invention relates to the production of a curled waterproofed ostrich-feather as a new article of manufacture, whereby it is rendered capable of retaining its shape and appearance when exposed to wet and dampness.

The invention is based on the discovery I have made that the quality of withstanding the effects of dampness can be imparted to dressed and curled ostrich-feathers without affecting or detracting from their shape, appearance, or value for ornamental or decorative purposes by spraying the feather, after the barbs thereof have been curled, with a waterproofing liquid and afterward exposing the sprayed feather to a heated atmosphere until dry.

In proceeding to carry out this invention I first prepare a waterproofing liquid by mixing together naphtha, gasolene, benzin, paraffin-oil, paraffin, stearin, spermacetti, and gum-dammar by melting the solid substances and then pouring them into the liquid substances previously mixed together and heated, and finally allowing the mixture to cool.

The following proportions of the above-named substances will be found to produce a waterproofing liquid that will impart the desired quality or condition without affecting the appearance of the most delicate plume or feather: paraffin, twenty (20) ounces; spermacetti, eight (8) ounces; stearin, four (4) ounces; gum-dammar, two (2) ounces; paraffin-oil, two (2) ounces; naphtha, gasolene, and benzin, two (2) gallons each.

Pouring the six gallons of the liquid substances into a vessel I apply heat by means of a steam-coil until the mixture is brought to a temperature of one hundred and sixty degrees (160°) Fahrenheit, and after melting and mixing together the remaining solid substances I pour them into the heated liquid and stir the mass until the whole is thoroughly incorporated. After cooling the liquid is ready for use.

The first step or operation in treating the feather after it has been curled is performed by placing a quantity of liquid in an air-tight tank provided with an outlet-tube, on the end of which is fixed an atomizer or spraying-nozzle, and by connecting an air-pump to the tank I produce a pressure in the tank from thirty pounds as the minimum to one hundred pounds as the maximum pressure per square inch. The degree of pressure employed to force the liquid in a spray from the nozzle is governed by the size, thickness, and other conditions of the feather being treated and is to be determined by the operator inspecting the article as the work goes on, care being taken during the operation to produce a thorough coating or covering of all parts of the feather without saturating it too heavily. At the end of this spraying operation the sprayed feather is subjected to the next step, which consists in exposing it in a heated room to a temperature of about eighty degrees (80°) to one hundred degrees (100°) Fahrenheit until it is thoroughly dried.

The proportions of the substances and the manner of preparing the waterproof mixture stated in the foregoing description are recommended for general use and can be safely followed without liability of injuring or affecting the most delicate plumes or curled feather.

I do not desire to be understood, however, as restricting or confining my process in any of its steps or operations to the exact proportions or quantities or the degrees of temperature herein given. The same may be varied without departing from the nature and scope of my invention.

By employing a high degree of pressure, as described, for spraying or atomizing the waterproofing liquid employed I insure the best results, as thereby not only is the liquid broken up into an exceedingly fine spray or mist, but this in turn is forced into intimate contact with all parts of the article being treated, so that an article such as a curled ostrich-plume, the surfaces of which lie in every conceivable plane, are all coated with comparative uniformity and without the saturation of any particular part.

Having thus fully described my invention, what I claim as new therein, and desire to secure by Letters Patent, is—

1. The herein-described process of producing a curled, waterproof ostrich-feather, consisting in first curling the barbs of the feather and then subjecting the feather to an exceedingly-fine mist or spay of a waterproofing substance, substantially as set forth.

2. The herein-described process of producing a curled, waterproof feather, consisting in first curling the barbs thereof and thereafter subjecting it to a spray of a solution of a waterproofing substance in a volatile liquid, substantially as set forth.

3. As a new article of manufacture, a curled, waterproof ostrich-feather, substantially as set forth.

In testimony whereof I have signed my name in the presence of two subscribing witnesses.

CHARLES ANSON POTTER.

Witnesses:
 EDWARD E. OSBORN,
 GEO. T. KNOX.